United States Patent
Hsu et al.

(10) Patent No.: US 9,539,893 B2
(45) Date of Patent: Jan. 10, 2017

(54) FUEL DELIVERY MODULE FOR LOW-PROFILE FUEL TANK

(71) Applicant: Spectra Premium Industries Inc., Boucherville (CA)

(72) Inventors: Chia Ching Emilie Hsu, Montreal (CA); Haixiang Liu, Brossard (CA)

(73) Assignee: Spectra Premium Industries Inc., Boucherville (CA)

( * ) Notice: Subject to any disclaimer, the term of this patent is extended or adjusted under 35 U.S.C. 154(b) by 177 days.

(21) Appl. No.: 14/500,355

(22) Filed: Sep. 29, 2014

(65) Prior Publication Data

US 2016/0089972 A1    Mar. 31, 2016

(51) Int. Cl.
| | |
|---|---|
| *F02M 37/04* | (2006.01) |
| *B60K 15/03* | (2006.01) |
| *B60K 15/067* | (2006.01) |
| *B60K 15/04* | (2006.01) |
| *F02M 37/10* | (2006.01) |

(52) U.S. Cl.
CPC ............ *B60K 15/03* (2013.01); *B60K 15/04* (2013.01); *B60K 15/067* (2013.01); *F02M 37/106* (2013.01); *B60K 2015/03328* (2013.01); *B60K 2015/0464* (2013.01)

(58) Field of Classification Search
CPC .... F02M 37/106; F02M 59/44; F02M 37/103; F02M 2037/225; F02M 2037/10; F02M 2037/025; F04B 39/14; F04B 53/22
USPC ................ 123/495, 497, 509; 220/562–564
See application file for complete search history.

(56) References Cited

U.S. PATENT DOCUMENTS

| | | | | |
|---|---|---|---|---|
| 5,044,526 | A * | 9/1991 | Sasaki | B29C 65/606 222/377 |
| 5,107,889 | A * | 4/1992 | Sasaki | B60K 15/077 123/514 |
| 5,445,503 | A * | 8/1995 | Kmiec | F04D 29/606 248/674 |
| 5,669,359 | A | 9/1997 | Kleppner et al. | |
| 6,000,913 | A * | 12/1999 | Chung | B60K 15/077 123/509 |
| 6,149,399 | A * | 11/2000 | Bowser | F02M 37/103 123/509 |
| 6,206,037 | B1 * | 3/2001 | Murakoshi | B60K 15/077 123/509 |
| 6,230,690 | B1 | 5/2001 | Umetsu | |
| 6,308,733 | B2 * | 10/2001 | Murakoshi | 123/509 |
| 6,598,594 | B2 | 7/2003 | Takahashi | |

(Continued)

*Primary Examiner* — Marguerite McMahon
*Assistant Examiner* — Tea Holbrook
(74) *Attorney, Agent, or Firm* — Borden Ladner Gervais LLP; Curtis B. Behmann (57) ABSTRACT

A fuel delivery module for a vehicle having a fuel tank. The fuel delivery module comprises a flange, a reservoir, a fuel pump, a guide rod, a guide rod receiver, and an elastically deformable member. The flange couples to an opening of the fuel tank. The reservoir is in fluid communication with the flange and a fuel pump connected to the reservoir transports fuel from inside the fuel tank to outside the fuel tank through the flange. The guide rod is coupled to the flange at a first end of the guide rod and the guide rod receiver is fixedly disposed on the reservoir. The elastically deformable member is moveably coupled to the guide rod and to the reservoir such that a second end of the guide rod is selectively receivable in the guide rod receiver.

20 Claims, 10 Drawing Sheets

(56) References Cited

U.S. PATENT DOCUMENTS

| | | | |
|---|---|---|---|
| 6,604,511 B2* | 8/2003 | Hazama | F02M 37/103 123/198 D |
| 6,716,000 B2 | 4/2004 | Appleton et al. | |
| 6,752,129 B2* | 6/2004 | Isozaki | F02M 37/103 123/509 |
| 6,877,522 B2 | 4/2005 | Dasilva et al. | |
| 7,159,573 B2 | 1/2007 | Okada | |
| 7,321,091 B1* | 1/2008 | Hsieh | G10G 5/00 84/387 A |
| 7,341,046 B2* | 3/2008 | Leymarie | F02M 25/0854 123/509 |
| 7,520,270 B2* | 4/2009 | Uhara | F02M 37/106 123/509 |
| 7,523,746 B2 | 4/2009 | Brusoe et al. | |
| 7,527,042 B2* | 5/2009 | Crary | F02M 37/106 123/198 D |
| 7,819,108 B2* | 10/2010 | Froehlich | F02M 37/106 123/509 |
| 8,424,565 B2* | 4/2013 | Solorio | B60K 15/03 123/509 |
| 8,584,339 B2* | 11/2013 | Mbog | B60K 15/077 220/562 |
| 2003/0080560 A1* | 5/2003 | Leymarie | B60K 15/03 285/308 |
| 2006/0213486 A1* | 9/2006 | Powell | B67D 7/3236 123/509 |
| 2007/0062493 A1* | 3/2007 | Crary | F02M 37/103 123/509 |
| 2008/0127944 A1* | 6/2008 | Ramamurthy | F02M 37/106 123/457 |
| 2009/0000673 A1* | 1/2009 | Ramamurthy | F02D 33/003 137/487.5 |
| 2011/0089186 A1* | 4/2011 | Solorio | B60K 15/03 220/810 |
| 2012/0247429 A1* | 10/2012 | Powell | F02M 37/103 123/495 |
| 2013/0098339 A1* | 4/2013 | Yoon | F02M 37/04 123/495 |

* cited by examiner

FUEL DELIVERY MODULE FOR LOW-PROFILE FUEL TANK

FIELD

The present disclosure relates generally to in-tank fuel delivery modules for automotive vehicular applications.

BACKGROUND

In low-profile (or shallow profile) automotive vehicle fuel tanks, such as saddle tanks, conventional fuel delivery modules are too tall to fit inside the tank because the fuel pump is mounted vertically and the height of the conventional fuel delivery module is too large for such applications. Reducing the height of the conventional fuel delivery module, which includes a fuel pump, results in a limitation of the fuel reservoir capacity of the fuel delivery module. Reducing the height of the conventional module further interferes with the function or packaging of the inner components of the fuel delivery module.

Alternatively, it is possible to reduce the height of the fuel delivery module, while retaining fuel reservoir capacity and inner component functionality, by enlarging the cross-section of the fuel delivery module in its horizontal plane; however, enlarging of the cross-section requires a corresponding enlarging of the opening of the fuel tank. This is undesirable because it reduces the strength of the fuel tank and increases the diffusion of fuel vapor from the fuel tank.

Thus, it is known to mount a conventionally-sized fuel delivery module in a substantially horizontal orientation within the low-profile fuel tank. By mounting the fuel delivery module in a substantially horizontal orientation, the fuel reservoir capacity and inner component functionality are unchanged. Furthermore, the horizontally-mounted fuel delivery module may be configured to accommodate a conventionally-sized fuel tank opening.

The fuel reservoir of the fuel delivery module may become unstable due to variations in the height of the fuel tank, a change in vehicle attitude, or even an alteration of the fuel tank shape. Improvements in fuel delivery modules for low-profile fuel tanks are therefore desired.

BRIEF DESCRIPTION OF THE DRAWINGS

Embodiments of the present disclosure will now be described, by way of example only, with reference to the attached Figures.

DETAILED DESCRIPTION

The present disclosure provides a fuel delivery module for a vehicle having a fuel tank. The fuel delivery module comprises a flange, a reservoir, a guide rod, a guide rod receiver, and an elastically deformable member. The flange couples to an opening of the fuel tank. The reservoir is in fluid communication with the flange to transport fuel from inside the fuel tank to outside the fuel tank through the flange. The reservoir comprises a bottom surface. The guide rod is coupled to the flange at a first end of the guide rod. The guide rod receiver is fixedly disposed on the reservoir. The elastically deformable member is moveably coupled to the guide rod and to the reservoir, such that a second end of the guide rod is selectively receivable in the guide rod receiver. Accordingly, the fuel delivery module is securely fitted to the fuel tank for a variety of operating conditions, and the fuel delivery module is easy and simple to install in a low profile fuel tank having a conventionally-sized opening.

In an embodiment of the present disclosure, a fuel delivery module for a vehicle having a fuel tank, the fuel delivery module comprises: a flange for coupling to an opening of the fuel tank; a reservoir in fluid communication with the flange; a fuel pump connected to the reservoir to transport fuel from inside the fuel tank to outside the fuel tank through the flange; a guide rod coupled to the flange at a first end of the guide rod; a guide rod receiver fixedly disposed on the reservoir; and an elastically deformable member moveably coupled to the guide rod and to the reservoir, such that a second end of the guide rod is selectively receivable in the guide rod receiver.

In a further embodiment of the present disclosure, the elastically deformable member is configured to move the fuel delivery module between an operating position in which the guide rod is received in the guide rod receiver, and an insertion position in which the guide rod is not received in the guide rod receiver.

In a further embodiment of the present disclosure, the guide rod receiver is positioned and oriented to be substantially co-axial to the guide rod when the reservoir is substantially horizontal and the fuel delivery module is in the operating position.

In a further embodiment of the present disclosure, the fuel delivery module further comprises a spring disposed to urge the reservoir toward a bottom surface of the fuel tank when the fuel delivery module is in the operating position.

In a further embodiment of the present disclosure, the spring urges the reservoir to be seated at the bottom surface of the fuel tank and to secure the reservoir in the operating position when the guide rod is received in the guide rod receiver.

In a further embodiment of the present disclosure, the reservoir comprises a bottom surface, and the spring and the bottom surface cooperate to restrict movement of the reservoir relative to the flange along the vertical axis.

In a further embodiment of the present disclosure, the guide rod and the guide rod receiver cooperate to restrict movement of the reservoir relative to the flange in the horizontal plane.

In a further embodiment of the present disclosure, the guide rod receiver comprises a conical region defining a draft angle for facilitating insertion of the guide rod into the guide rod receiver.

In a further embodiment of the present disclosure, the guide rod comprises a pair of guide rods each coupled to the flange at a first end of the guide rod; the guide rod receiver comprises a pair of a guide rod receivers fixedly disposed on the reservoir; and the elastically deformable member is moveably coupled to the pair of guide rods and to the reservoir, such that a second end of each of the guide rods is selectively receivable in one of the pair of guide rod receivers.

In a further embodiment of the present disclosure, the fuel delivery module further comprises a jet pump provided in the reservoir to create a venturi effect to draw fuel from the fuel tank into an interior volume of the reservoir.

In a further embodiment of the present disclosure, the fuel pump is disposed in the reservoir and a fuel line connects the fuel pump to the flange to deliver fuel from the interior volume of the reservoir to the flange.

In a further embodiment of the present disclosure, the fuel delivery module further comprises, in the reservoir, a pressure regulator and a fuel filter for controlling the fuel delivered by the fuel pump to the flange.

In a further embodiment of the present disclosure, the elastically deformable member comprises a metal strip for providing a rotation movement of the reservoir relative to the guide rod.

In a further embodiment of the present disclosure, the elastically deformable member further comprises a sliding member to connect the metal strip to the guide rod, and the sliding member provides a sliding movement of the reservoir relative to the guide rod.

In a further embodiment of the present disclosure, the fuel delivery module further comprises a ring stopper disposed on the guide rod to cooperate with the sliding member to define a limit of linear movement for the reservoir relative to the guide rod.

In a further embodiment of the present disclosure, the elastically deformable member comprises a metal string.

In a further embodiment of the present disclosure, the fuel delivery module further comprises a handle to manipulate the linear movement of the reservoir relative to the guide rod and the flange.

In another embodiment of the present disclosure, a fuel delivery module for a vehicle having a low profile fuel tank, the fuel delivery module comprises: a flange for coupling to an opening of the low profile fuel tank; a reservoir in fluid communication with the flange to transport fuel from inside the fuel tank to outside the low profile fuel tank through the flange, the reservoir comprising a bottom surface; a connecting member for connecting the flange to the reservoir, the connecting member including an elastically deformable member configured to facilitate movement of the fuel delivery module between an insertion position in which the reservoir is movably coupled to the flange to permit installation of the fuel delivery module in the low profile fuel tank, and an operating position in which the reservoir is fixedly coupled to the flange to securely seat the fuel delivery module in the low profile fuel tank.

In a further embodiment of the present disclosure, the elastically deformable member is shaped and constructed to permit variable orientation of the reservoir relative to the flange in the insertion position.

In yet another embodiment of the present disclosure, a two-position connecting member for connecting a flange of a fuel delivery module to a reservoir of the fuel delivery module, the connecting member comprises: a guide rod coupled to the flange at a first end of the guide rod; a guide rod receiver fixedly disposed on the reservoir; and, an elastically deformable member moveably coupled to the guide rod and to the reservoir, such that a second end of the guide rod is selectively receivable in the guide rod receiver so as to facilitate movement of the fuel delivery module between an insertion position in which the reservoir is movably coupled to the flange, and an operating position in which the reservoir is fixedly coupled to the flange.

Other aspects and features of the present disclosure will become apparent to those ordinarily skilled in the art upon review of the following description of specific embodiments in conjunction with the accompanying figures.

An example of a known horizontally-mounted reservoir is described in U.S. Pat. No. 5,669,359 (the '359 patent). The '359 patent provides a rod-shaped element which acts to support the fuel pump and bias the pump downwardly toward the bottom of the fuel tank. This rod serves both functions of support and deflection. The rod is limited in the amount of deflection which it can provide before plastic deformation or fracture occurs in the rod. Therefore the fuel delivery module of the '359 patent may not articulate adequately to facilitate installation through an opening of low profile fuel tank.

U.S. Pat. No. 6,230,690 (the '690 patent), describes a fuel delivery module comprising a connecting member to rotatably support a reservoir, and an elastic member on the connecting member urges the reservoir against the bottom of the fuel tank. However, the fuel delivery module of the '690 patent is freely rotatable, which causes undesirable instability of the fuel reservoir when the reservoir is installed and seated on the bottom of the tank.

Embodiments of the present disclosure provide a means to properly position the fuel delivery module in the tank in a substantially horizontal orientation such that the fuel delivery module is securely fitted to the fuel tank for any time and any condition. Embodiments of the present disclosure also provide a fuel delivery module that is easy and simple to install in a low profile fuel tank having a conventionally-sized opening.

A first embodiment of the present disclosure will now be described with reference to FIGS. 1 to 8.

Figure 1:
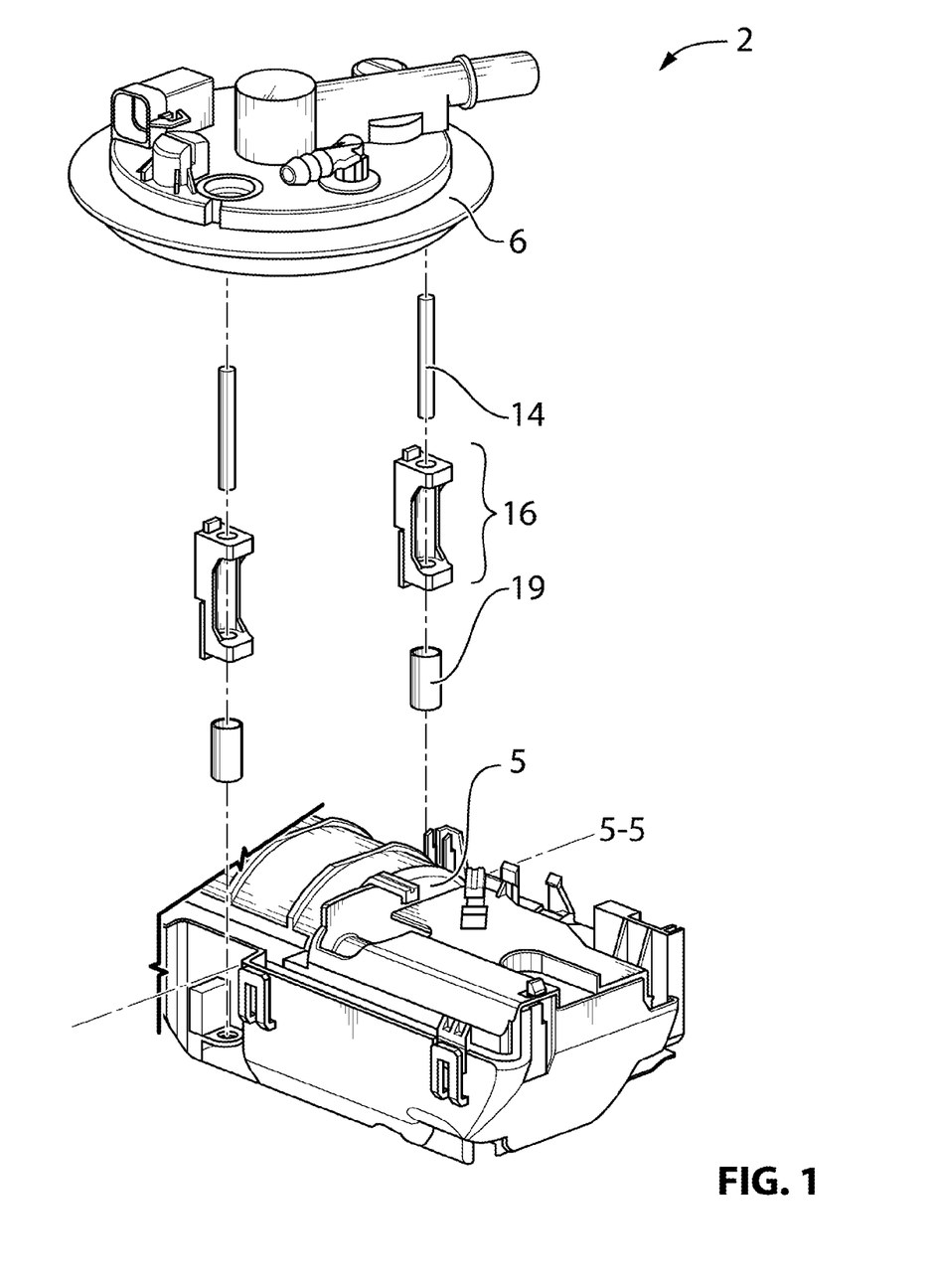
FIG. 1 illustrates an exploded perspective view of selected elements of a fuel delivery module according to a first embodiment of the present disclosure.

FIG. 1 illustrates an exploded perspective view of selected elements of a fuel delivery module 2 according to an embodiment of the present disclosure. The fuel delivery module 2 generally comprises a flange 6, a reservoir 5, a guide rod 14, a guide rod receiver 19, and an elastically deformable member 16. The guide rod 14 and the elastically deformable member 16 are moveably coupled and cooperate to provide a moveable connection between the reservoir 5 and the flange 6. The guide rod receiver 19 is fixedly disposed on the reservoir 5 and selectively receives the guide rod 14 based on the relative movement of the flange 6 and the reservoir 5.

Figure 2:
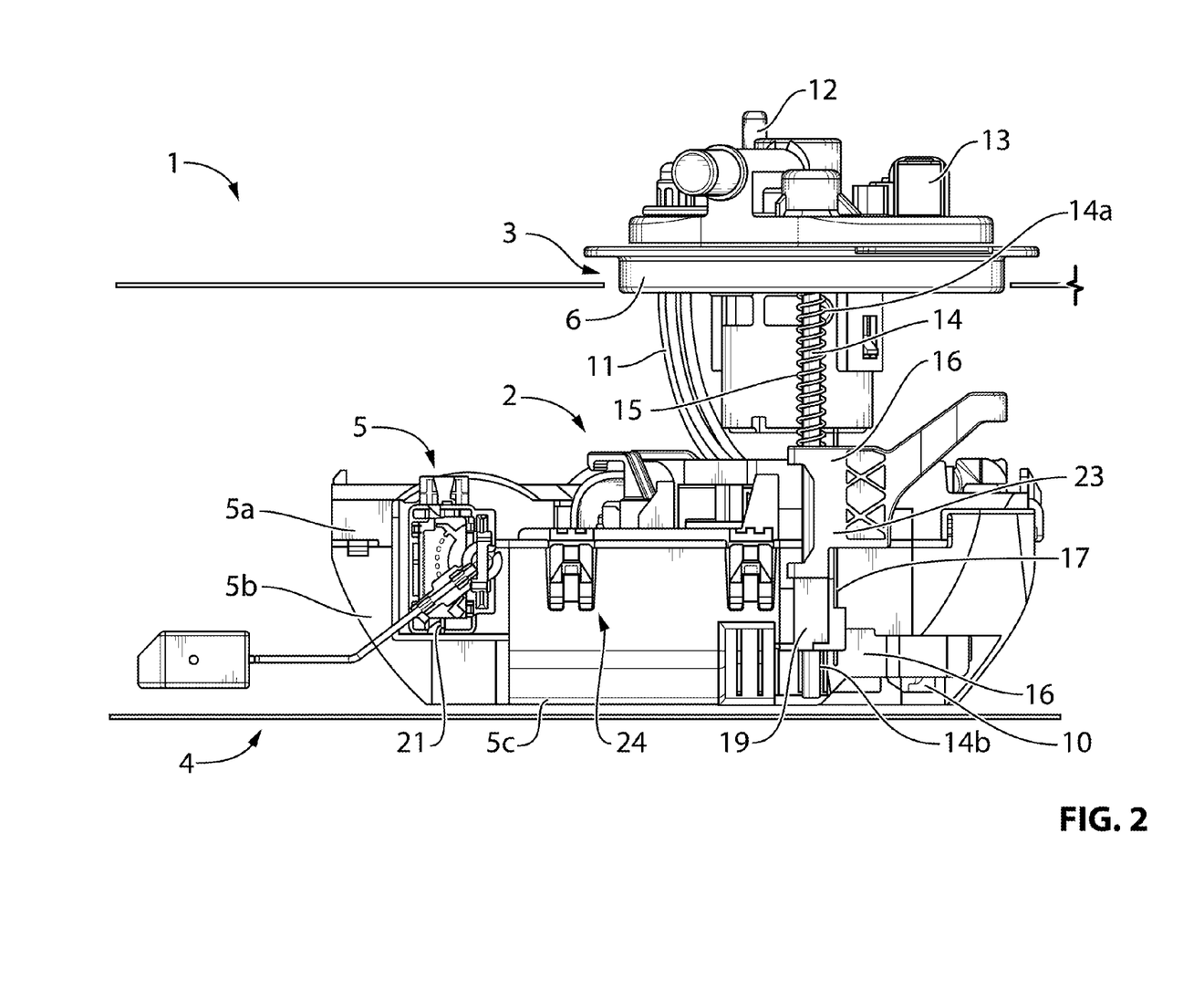
FIG. 2 illustrates a side elevation view of a fuel delivery module according to a first embodiment of the present disclosure.

FIG. 2 illustrates a side elevation view of a fuel tank 1 of an automotive vehicle having the fuel delivery module 2 arranged to operate with the fuel tank 1. The flange 6 is fitted to an opening 3 defined in the top side of the fuel tank 1, which has a low-profile configuration. The reservoir 5 is installed for operation within the fuel tank 1. According to an example embodiment of the present disclosure, the reservoir 5 comprises an upper reservoir 5a and a lower reservoir 5b that are joined by a snap fitting 24.

The reservoir 5 is in fluid communication with the flange 6 to transport fuel from inside the fuel tank 1 to outside the fuel tank 1 through the flange 6. In operation, the reservoir 5 is preferably seated against a bottom surface 4 of the fuel tank 1, as shown in FIG. 2. It is preferable for the reservoir 5 to be seated as securely as possible in this manner. According to an embodiment of the present disclosure, the elastically deformable member 16 provides the support to secure the reservoir 5 when the reservoir is seated.

The elastically deformable member 16 is moveably coupled to the guide rod 14 and to the reservoir 5 such that a second end 14b of the guide rod is selectively receivable in the guide rod receiver 19. A first end 14a of the guide rod is fixedly connected to the flange 6. Thus, the reservoir 5 is moveably coupled to the flange 6 in one position, and fixedly coupled to the flange 6 in another position.

In the first position, or insertion position, in which the second end 14b of the guide rod is not received in the guide rod receiver 19, the reservoir 5 is moveably coupled to the flange 6. Hence, the orientation of the reservoir 5 may be varied relative to the flange 6, allowing the reservoir to clear the dimension of the opening 3, thus facilitating installation of the fuel delivery module 2 to the fuel tank 1.

In the second position, or operating position, in which the second end of the guide rod 14b is received in the guide rod receiver 19, and the reservoir 5 is seated at the bottom surface 4 of the fuel tank 1, the reservoir 5 is fixedly coupled to the flange 6. By fixedly coupling the reservoir 5 to the flange 6, the reservoir 5 is more securely seated.

According to an example embodiment of the present disclosure, the fuel delivery module 2 comprises a spring 15 disposed to urge the reservoir 5 towards the bottom surface 4 of the fuel tank 1. The spring 15 helps to fixedly couple the reservoir 5 to the flange 6 when the second end 14b of the guide rod is received in the guide rod receiver 19; by urging the reservoir 5 towards the bottom surface 4 of the fuel tank 1, the spring 15 and the bottom surface 4 cooperate to restrict movement of the reservoir 5 relative to the flange 6 along the vertical axis. When the guide rod 14 is received in the guide rod receiver 19, the guide rod 14 and the guide rod receiver 19 cooperate to restrict movement of the reservoir 5 relative to the flange 6 in any direction in the horizontal plane.

Figure 3:
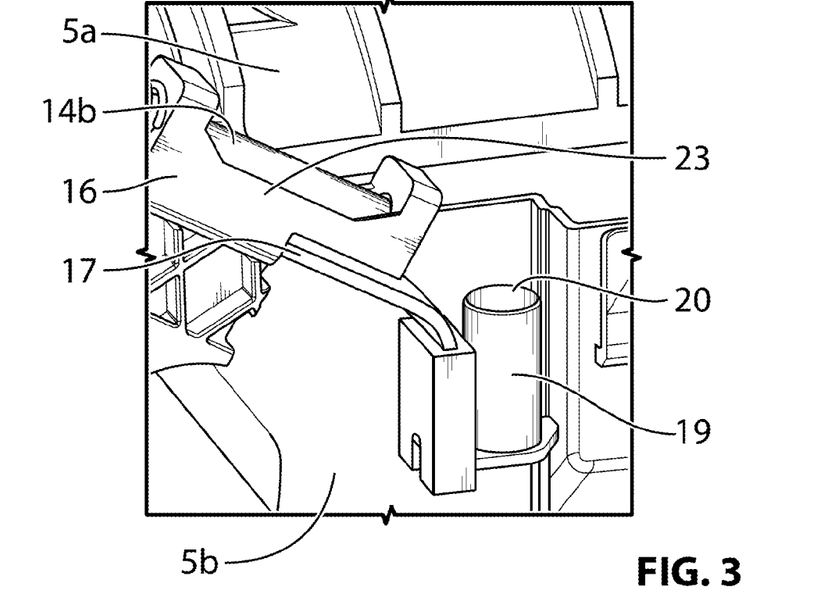
FIG. 3 illustrates a detailed perspective view of a fuel delivery module according to a first embodiment of the present disclosure.

FIG. 3 illustrates a detailed perspective view of the second end 14b of the guide rod, the elastically deformable member 16, and the guide rod receiver 19. According to an embodiment of the present disclosure, the elastically deformable member 16 comprises a metal strip 17 and a sliding member 23. The metal strip 17 can be, for example, a thin sheet of metal that is elastically bendable. In an embodiment, the metal strip 17 functions as a pivot joint.

One end of the metal strip 17 is connected to the sliding member 23, which is moveably received on the guide rod 14. The other end of the metal strip 17 is connected to the reservoir 5. In operation, the guide rod 14 and the sliding member 23 cooperate to allow the reservoir 5 to move relative to the flange 6; the reservoir 5 can move close to, or away from, the flange 6 along a path defined by the longitudinal axis of the guide rod 14. Furthermore, the metal strip 17 allows the reservoir 5 to move relative to the flange 6 in another manner. Specifically, the reservoir 5 can rotate about an axis 5-5 defined by a line drawn between two metal strips 17 positioned on each lateral side of the fuel delivery module; this is described in further detail with reference to FIG. 5 below.

In FIG. 3, the metal strip 17 is elastically deformed to allow installation of the fuel delivery module to the fuel tank. In operation, the metal strip 17 bends during the installation of the fuel delivery module to the fuel tank. The metal strip 17 bends at an angle to facilitate the insertion of the fuel delivery module in the fuel tank. In particular, the bend of the metal strip 17 allows the fuel delivery module to reconfigure into a partially or substantially vertical orientation such that the horizontal plane cross-section of the fuel delivery module in the partially or substantially vertical orientation is smaller in dimension than the opening of the fuel tank.

Figure 4:
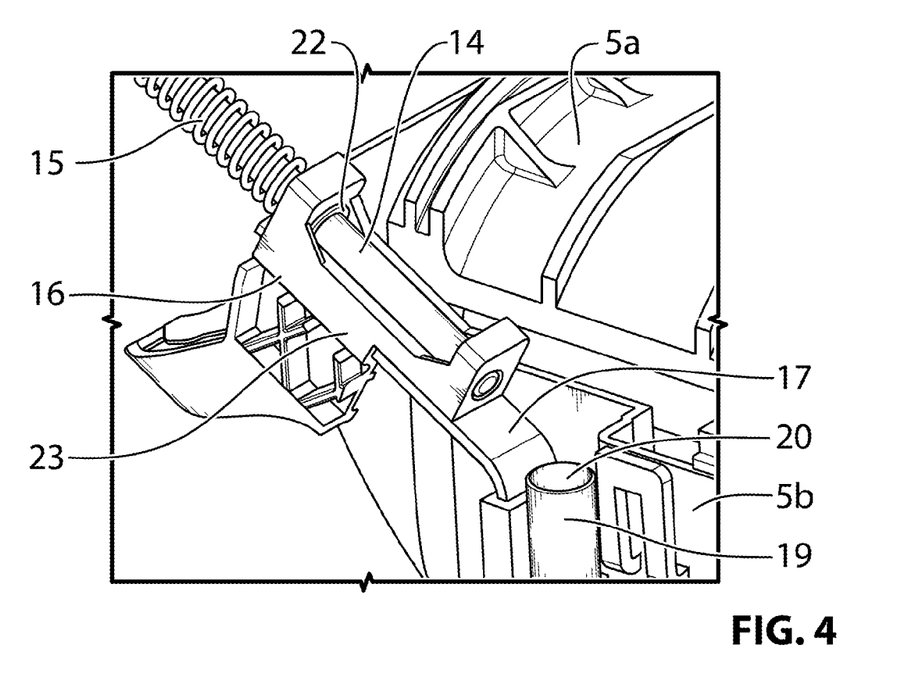
FIG. 4 illustrates another detailed perspective view of a fuel delivery module according to a first embodiment of the present disclosure.

FIG. 4 illustrates another detailed perspective view of the second end 14b of the guide rod, the elastically deformable member 16, and the guide rod receiver 19. A ring stopper 22 is provided on the second end 14b of the guide rod. The ring stopper 22 ensures that the flange 6 is connected with the reservoir 5 via the guide rod 14 and the elastically deformable member 16. In other words, the ring stopper 22 defines a limit of movement for the sliding member 23 relative to the guide rod 14. The ring stopper 22 prevents the sliding member 23 from disconnecting from the guide rod 14, which ultimately prevents the reservoir 5 from separating from the flange 6.

FIG. 4 further illustrates details of the guide rod receiver 19. The guide rod receiver 19 is located near the connection between the metal strip 17 and the reservoir 5. The guide rod receiver 19 is positioned and oriented to receive the second end 14b of the guide rod when the reservoir 5 is in a substantially horizontal orientation and when the reservoir 5 is urged towards the flange 6. Hence, the cylindrical axis of the guide rod receiver 19 is normal to the horizontal plane of the reservoir 5 when the reservoir is in operation. Furthermore, the guide rod receiver 19 is located at a distance from the metal strip 17 such that it is co-axial to the guide rod 14 so that the guide rod receiver can receive the guide rod.

The guide rod receiver 19 comprises a region 20 for receiving the guide rod 14. The region 20 may be a conical shape (not shown) defining a draft angle and which is configured to facilitate easy and accurate insertion of the guide rod 14 into the guide rod receiver 19 when the fuel delivery module is installed to the fuel tank and when the reservoir 5 is urged toward the bottom surface 4 of the fuel tank. The diameter of the guide rod receiver 19 is sized to secure the fitting and positioning of the fuel delivery module once installed to the fuel tank.

Figure 5:
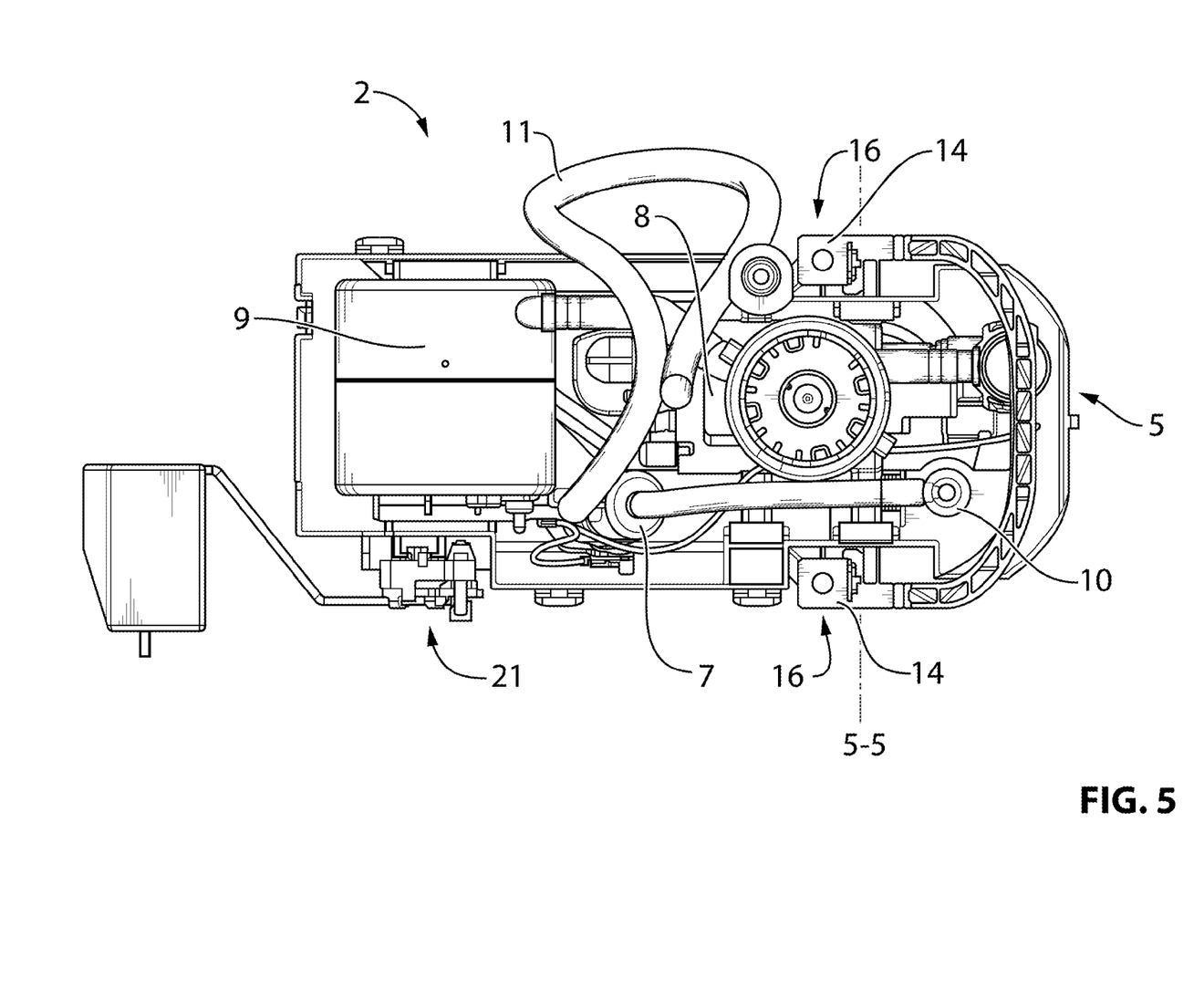
FIG. 5 illustrates a top plan view of a fuel delivery module according to a first embodiment of the present disclosure.

FIG. 5 illustrates a top plan view of the fuel delivery module 2. In an embodiment, the fuel delivery module 2 comprises a conventional jet pump 10 for creating a venturi effect to draw fuel from the fuel tank 1 to the reservoir 5.

Fuel in the reservoir is then delivered to the flange via a fuel pump 8 that is mounted within the reservoir 5. The fuel pump 8 is mounted in a horizontal orientation with respect to a bottom surface 4 of the fuel tank 1. In addition to the fuel pump 8, a pressure regulator 7 and a fuel filter 9 are disposed in the reservoir 5 of the fuel delivery module 2. The pump 8 delivers fuel from the reservoir 5 via a flexible fuel line 11 to a connecting tube 12 arranged on a side of the flange 6 disposed on the outside of the fuel tank 1, as shown in FIG. 2. The flange 6 permits the connecting tube 12 and electrical connections 13 to pass through and enter the fuel tank 1. A forward-flow line (not illustrated) can be connected to the connecting tube 12 in order to provide fuel to an internal combustion engine. On a lateral side of the reservoir 5, a fuel level sender assembly 21 is arranged on the reservoir 5 to detect the fuel level inside the fuel tank 1.

According to an embodiment of the present disclosure, FIG. 5 shows that fuel delivery module 2 comprises a pair of guide rods 14 and elastically deformable members 16. The pair of guide rods 14 and elastically deformable members 16 are disposed on each lateral side of the reservoir 5. The orientation of the connection between the guide rod 14 and the elastically deformable member 16 is mirrored on each side so that the reservoir 5 can rotate about an axis 5-5 defined by a line drawn between each elastically deformable member 16.

A method of installing the fuel delivery module 2 of the first embodiment to the fuel tank 1 will now be described.

Figure 6:
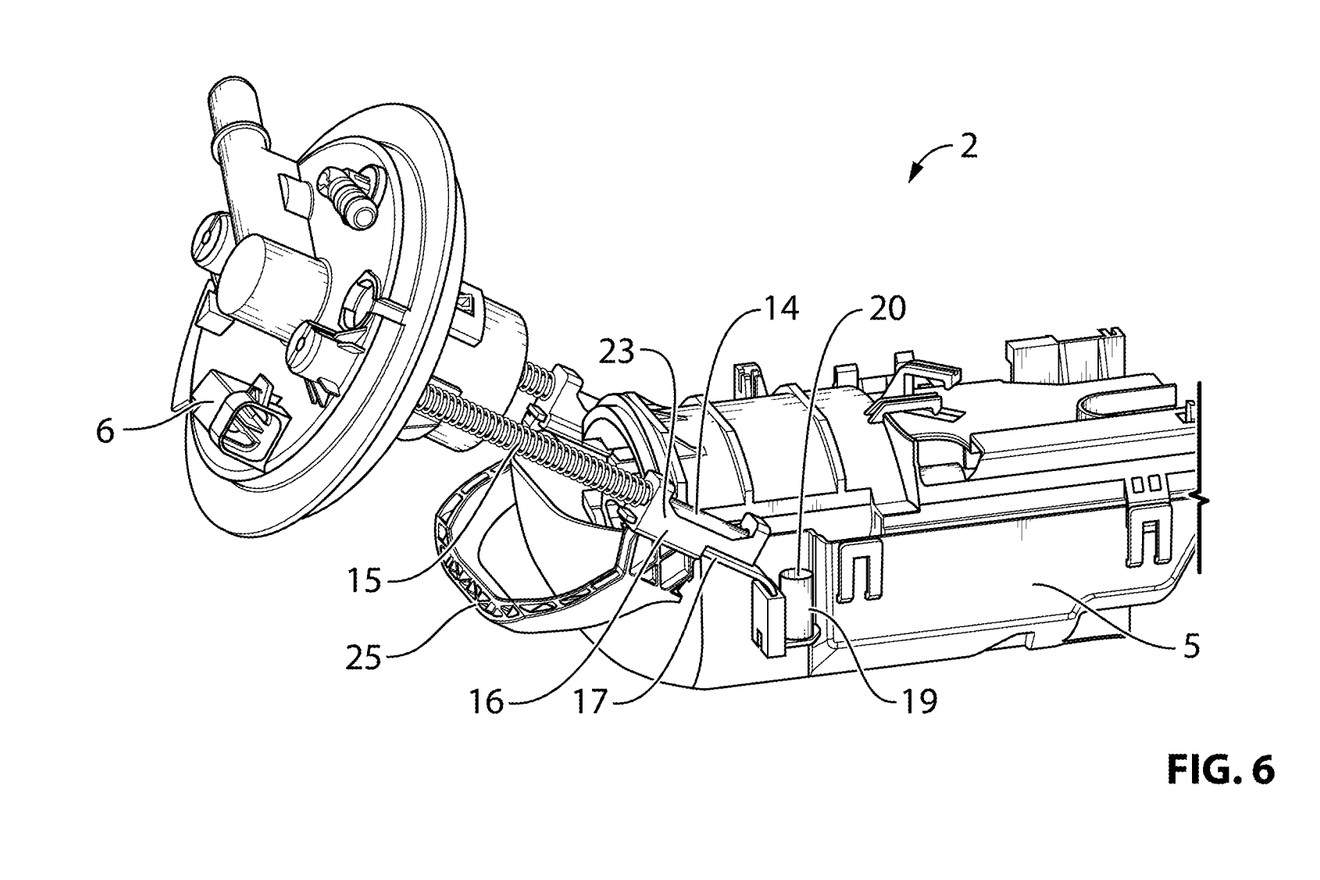
FIG. 6 illustrates a perspective view of a fuel delivery module according to a first embodiment of the present disclosure prior to installation with a fuel tank.

FIG. 6 illustrates a perspective view of the fuel delivery module 2 configured at a predetermined angle for insertion in the opening of the fuel tank. The reservoir 5 is first inserted into the opening of the fuel tank by bending the metal strip 17 coupled to the guide rod 14. Since the reservoir 5 is disposed at an angle relative to the flange 6, the reservoir 5 can be easily inserted into the opening of the fuel tank with simple hand manipulation.

Once the reservoir 5 is fully inserted into the fuel tank, past the opening, the reservoir 5 is rotated relative to the flange 6 about an axis 5-5 defined by a line drawn between each metal strip 17 of the elastically deformable members 16. When the reservoir 5 is rotated such that the reservoir is substantially horizontal, each of the guide rod receivers 19 will become substantially co-axial to each of the guide rods 14. Next, the flange 6 is urged toward the opening and the guide rods 14 are urged toward the guide rod receivers 19. In an embodiment, the draft angle of the region 20 of the guide rod receivers 19 directs each guide rod 14 to be easily and accurately received in the respective guide rod receivers 19 on the reservoir 5.

As shown in FIG. 6, the fuel delivery module 2 optionally comprises a handle 25 coupled to the sliding member 23. The handle 25 can be operated to manipulate the sliding movement of the sliding member 23 relative to the guide rod 14 and the flange 6. In particular, the handle 25 can be used to overcome the decompression force of the spring 15.

Figure 7:
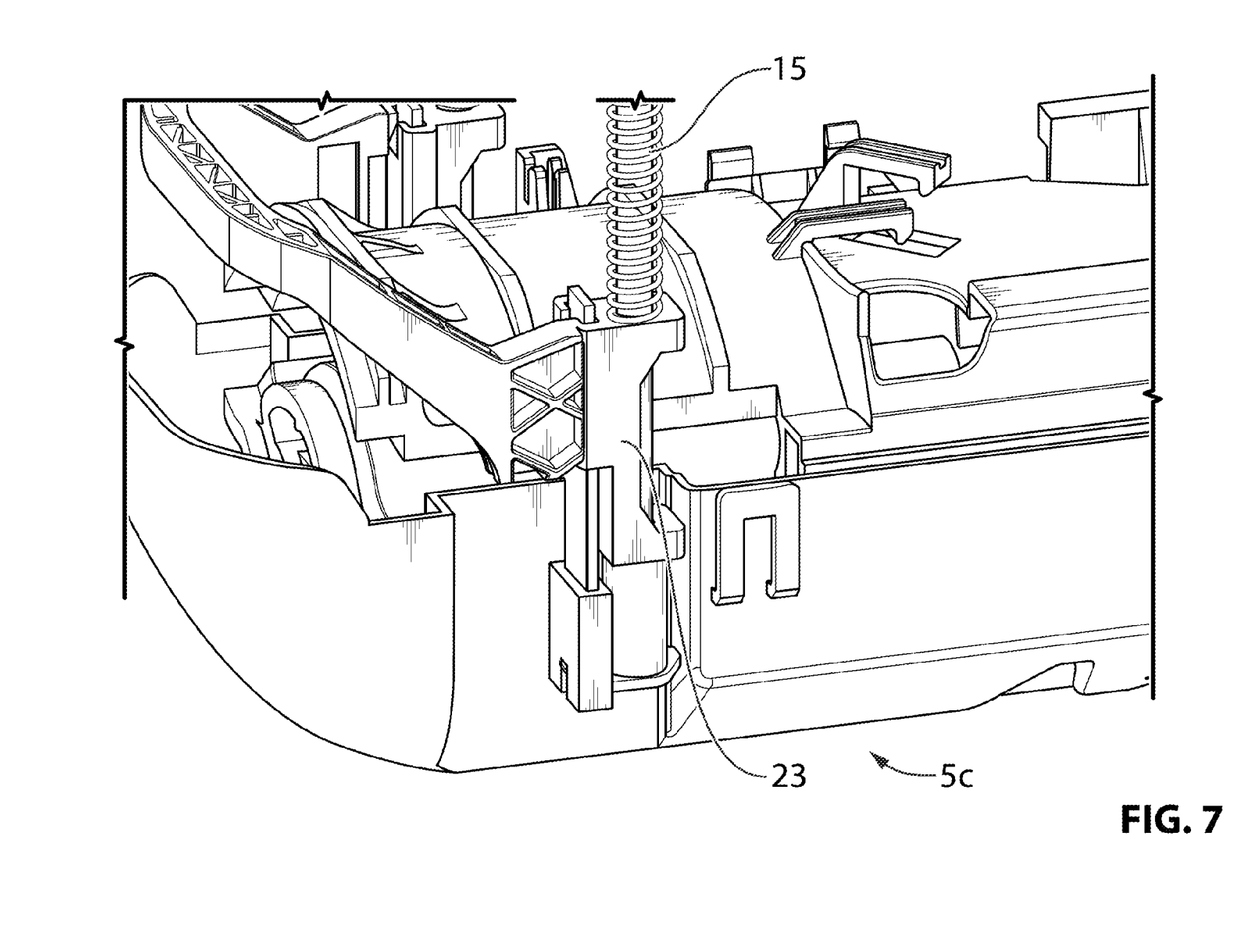
FIG. 7 illustrates a perspective view of a fuel delivery module according to a first embodiment of the present disclosure installed with a fuel tank.

FIG. 7 illustrates a perspective view of the fuel delivery module 2 in an operating position after installation to the fuel tank. As the flange 6 is urged toward the opening, the spring 15 is compressed between the flange and the sliding member 23. The decompression force of the spring 15 consequently urges the bottom face 5c of the reservoir to seat upon the bottom surface of the fuel tank as illustrated in FIG. 7.

Figure 8:
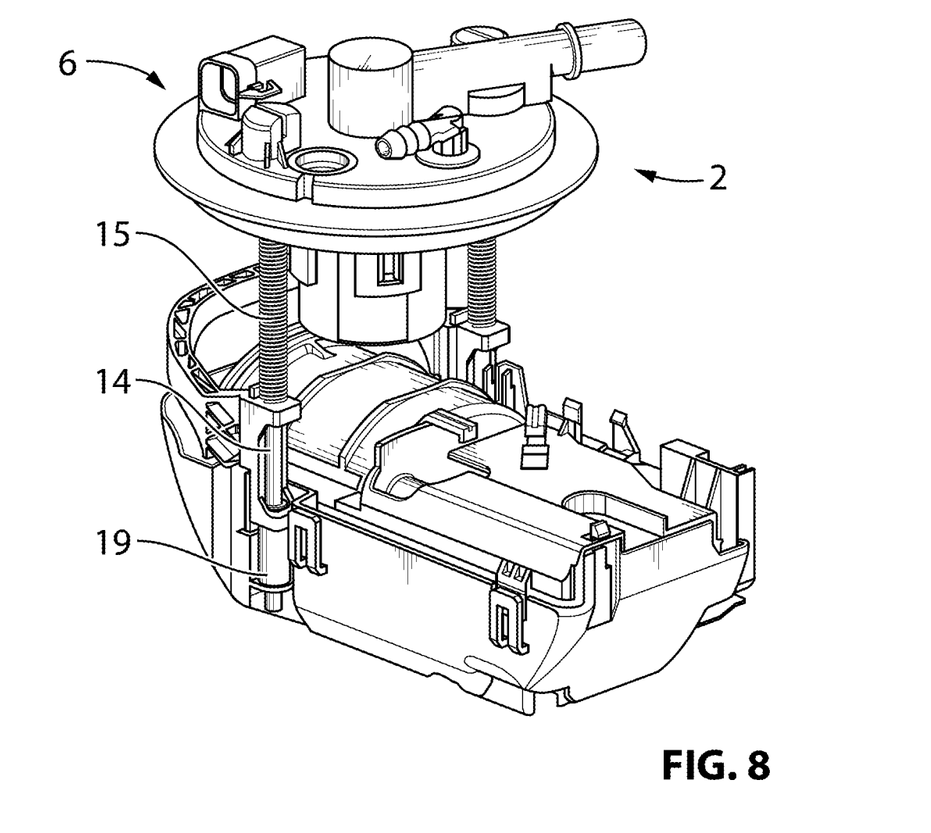
FIG. 8 illustrates another perspective view of a fuel delivery module according to a first embodiment of the present disclosure installed with a fuel tank.

FIG. 8 illustrates another perspective view of the fuel delivery module 2 in an operating position after installation to the fuel tank. The flange 6 is coupled to the opening of the fuel tank upon installation of the fuel delivery module 2 to the fuel tank. When the flange 6 is coupled to the opening, the reservoir 5 is urged against the bottom surface of the fuel tank by the decompression force of the spring 15. Once the reservoir 5 seats firmly upon the bottom surface of the fuel tank, the reservoir 5 will not experience instability due to a fluctuation of fuel weight, a change in vehicle attitude, or a deformation to the fuel tank. The reservoir 5 is secured within the fuel tank in this stable manner because the reservoir 5 is always urged toward the bottom surface by the spring 15, and because the reservoir 5 is also secured by the guide rods 14 received in the guide rod receivers 19. Thus, the reservoir 5 of the fuel delivery module 2 is steadily positioned inside the fuel tank at all times and in all conditions. Accordingly, securing the position of the reservoir 5 in the fuel tank also minimizes fuel level detection error.

Figure 9:
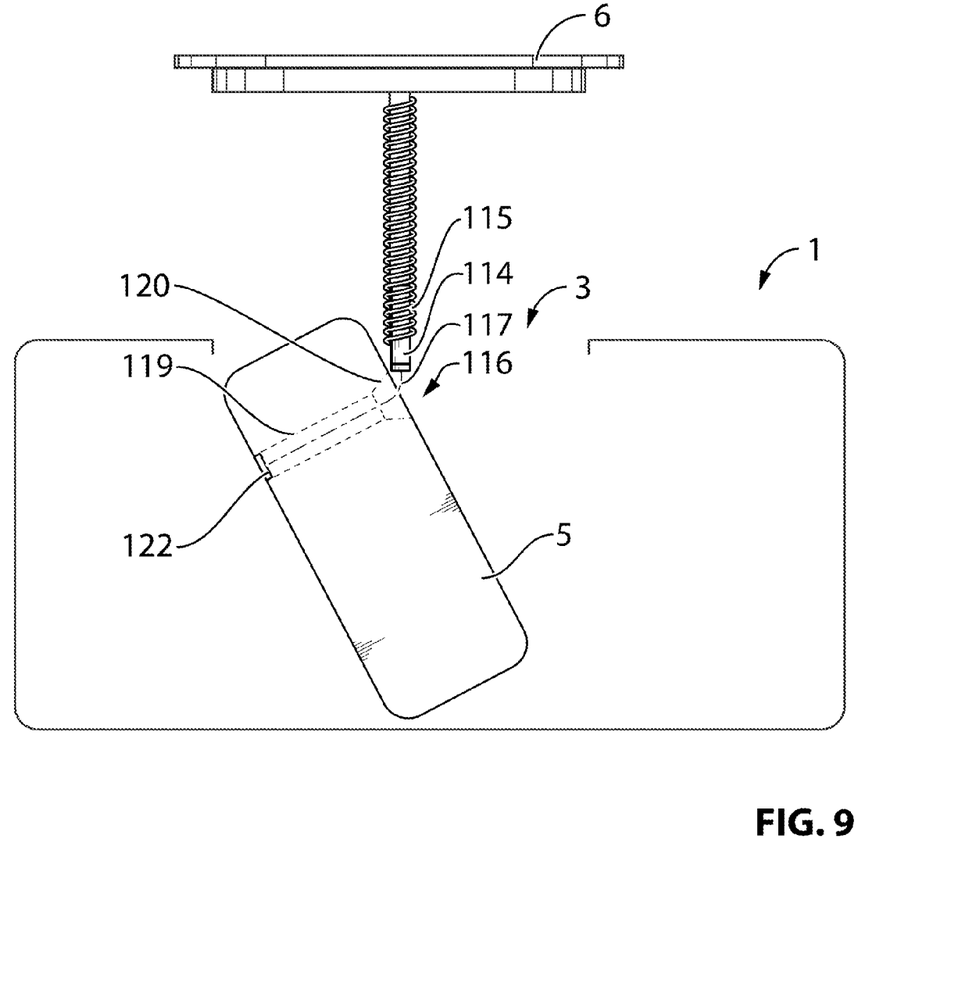
FIG. 9 illustrates a cross-sectional side elevation view of a fuel delivery module according to a second embodiment of the present disclosure.
Figure 10:
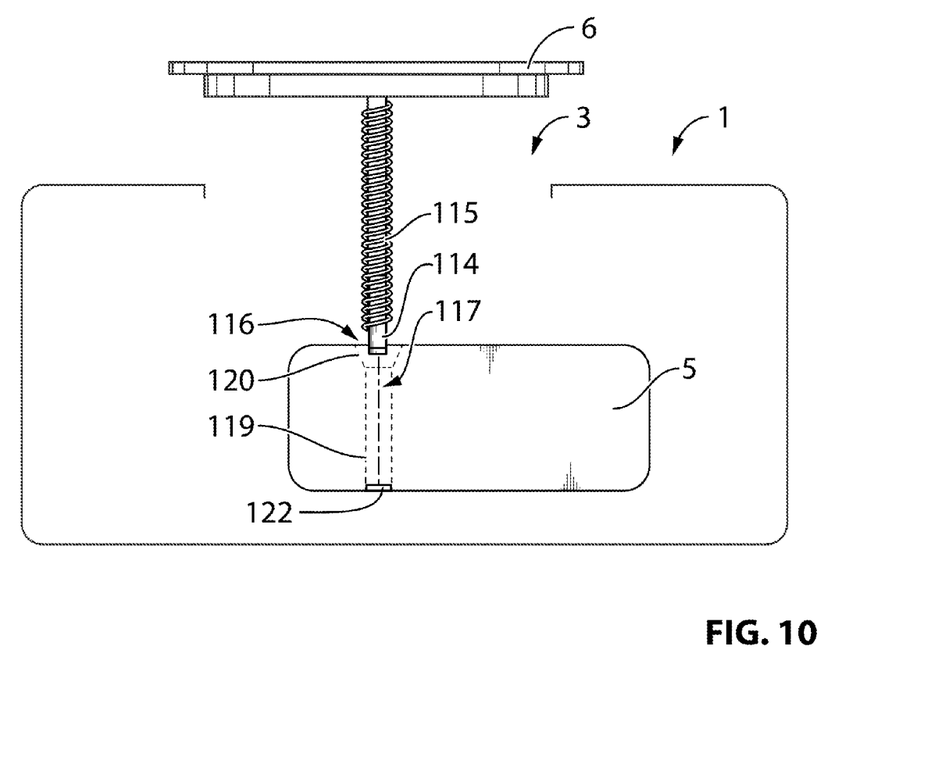
FIG. 10 illustrates a cross-sectional side elevation view of a fuel delivery module according to a second embodiment of the present disclosure during installation with a fuel tank.
Figure 11:
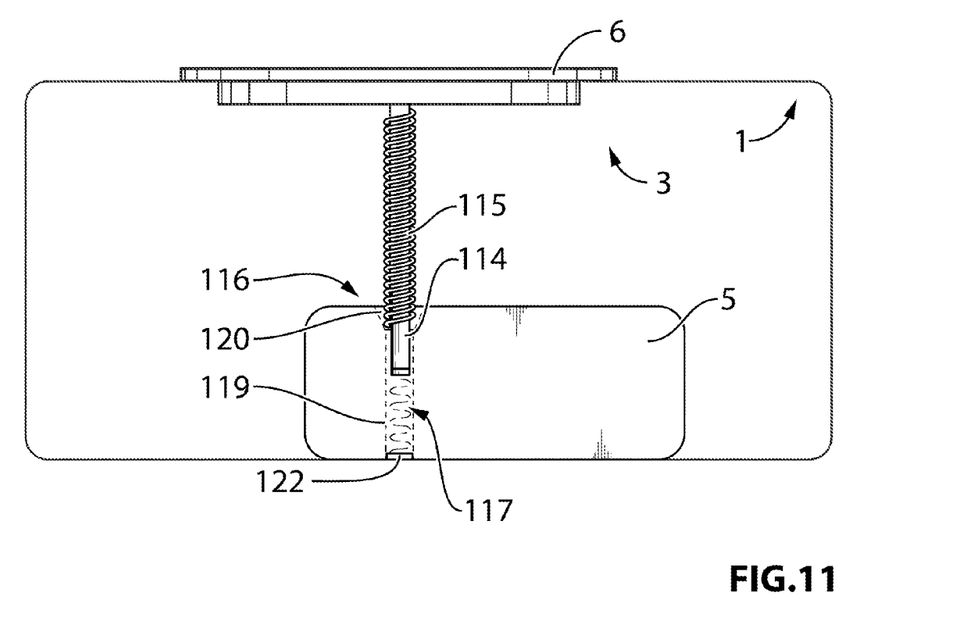
FIG. 11 illustrates a cross-sectional side elevation view of a fuel delivery module according to a second embodiment of the present disclosure after installation with a fuel tank.

A second embodiment of a fuel delivery module according to the present disclosure is shown in FIGS. 9 to 11.

FIG. 9 illustrates a cross-sectional side elevation view of a fuel delivery module of a second embodiment prior to installation with a fuel tank 1. In the second embodiment of the fuel delivery module, an elastically deformable member 116 comprises a metal string 117 attached at a second end of a guide rod 114 and connected to the bottom of the reservoir 5 by a ring stopper 122. The metal string 117 has a predetermined length that limits the insertion movement of the fuel delivery module in the fuel tank 1. The fuel delivery module further comprises a guide rod receiver 119 located on the reservoir 5. The guide rod receiver 119 comprises a conical region 120 defining a draft angle, which facilitates insertion of the guide rod 114 easily and accurately into the guide rod receiver 119 when the reservoir 5 is oriented in a substantially horizontal manner.

A method of installing the fuel delivery module of the second embodiment to the fuel tank will now be described.

Reservoir 5 is first inserted into the opening 3 of the fuel tank 1 by bending the metal string 117 coupled to the guide rod 114, as shown in FIG. 9. The reservoir 5 is disposed at an angle relative to the flange 6 such that the reservoir 5 can be easily inserted into the opening 3 of the fuel tank 1 with simple hand manipulation.

FIG. 10 illustrates another cross-sectional side elevation view of the fuel delivery module. Once the reservoir 5 is fully inserted into the fuel tank 1, past the opening 3, the reservoir 5 is rotated relative to the flange 6 such that the reservoir is substantially oriented in the horizontal plane, as shown in FIG. 10. At this point, the guide rod receiver 119 will become substantially co-axial to the guide rod 114. Next, the flange 6 is urged toward the opening 3 and the guide rod 114 is urged toward the guide rod receiver 119. The conical region 120 of the guide rod receiver 119 directs the guide rod 114 to be easily and accurately received in the guide rod receiver 119 on the reservoir 5.

FIG. 11 illustrates a cross-sectional side elevation view of the fuel delivery module as the flange 6 is urged toward the opening 3, and the spring 115 is compressed between the flange 6 and the guide rod receiver 119. The decompression force of the spring 115 consequently urges the bottom face of the reservoir 5 to seat upon the bottom surface of the fuel tank 1. The flange 6 is coupled to the opening 3 of the fuel tank 1 upon installation of the fuel delivery module to the fuel tank 1. When the flange 6 is coupled to the opening 3, the reservoir 5 is urged against the bottom surface of the fuel tank 1 by the decompression force of the spring 115. Once the reservoir 5 seats firmly upon the bottom surface of the fuel tank 1, the reservoir 5 will not experience instability due to a fluctuation of fuel weight, a change in vehicle attitude, or a deformation to the fuel tank 1. The reservoir 5 is secured within the fuel tank 1 in this stable manner because the reservoir 5 is always urged toward the bottom surface by the spring 115, and because the reservoir 5 is also secured by the guide rod 114 received in the guide rod receiver 119. Thus, the reservoir 5 of the fuel delivery module is steadily positioned inside the fuel tank 1 for a variety of operating conditions. Accordingly, securing the position of the reservoir 5 in the fuel tank also minimizes fuel level detection error.

In the preceding description, for purposes of explanation, numerous details are set forth in order to provide a thorough understanding of the embodiments. However, it will be apparent to one skilled in the art that these specific details are not required.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A fuel delivery module for a vehicle having a fuel tank, the fuel delivery module comprising:
   a flange for coupling to an opening of the fuel tank;
   a reservoir in fluid communication with the flange;
   a fuel pump connected to the reservoir to transport fuel from inside the fuel tank to outside the fuel tank through the flange;
   a guide rod coupled to the flange at a first end of the guide rod;
   a guide rod receiver fixedly disposed on the reservoir; and
   an elastically deformable member having a first end moveably coupled to the guide rod and a second end fixedly attached to the reservoir, such that a second end of the guide rod is selectively receivable in the guide rod receiver.

2. The fuel delivery module of claim 1, wherein the elastically deformable member is configured to move the fuel delivery module between an operating position in which the guide rod is received in the guide rod receiver, and an insertion position in which the guide rod is not received in the guide rod receiver.

3. The fuel delivery module of claim 2, wherein the guide rod receiver is positioned and oriented to be substantially co-axial to the guide rod when the reservoir is substantially horizontal and the fuel delivery module is in the operating position.

4. The fuel delivery module of claim 2, further comprising a spring disposed to urge the reservoir toward a bottom surface of the fuel tank when the fuel delivery module is in the operating position.

5. The fuel delivery module of claim 4, wherein the spring urges the reservoir to be seated at the bottom surface of the fuel tank and to secure the reservoir in the operating position when the guide rod is received in the guide rod receiver.

6. The fuel delivery module of claim 5, wherein the reservoir comprises a bottom surface, and wherein the spring and the bottom surface cooperate to restrict movement of the reservoir relative to the flange along the vertical axis.

7. The fuel delivery module of claim 1, wherein the guide rod and the guide rod receiver cooperate to restrict movement of the reservoir relative to the flange in the horizontal plane.

8. The fuel delivery module of claim 1, wherein the guide rod receiver comprises a conical region defining a draft angle for facilitating insertion of the guide rod into the guide rod receiver.

9. The fuel delivery module of claim 1, wherein:
   the guide rod comprises a pair of guide rods each coupled to the flange at a first end of the guide rod;
   the guide rod receiver comprises a pair of a guide rod receivers fixedly disposed on the reservoir; and
   the elastically deformable member is moveably coupled to the pair of guide rods and to the reservoir, such that a second end of each of the guide rods is selectively receivable in one of the pair of guide rod receivers.

10. The fuel delivery module of claim 1, further comprising a jet pump provided in the reservoir to create a venturi effect to draw fuel from the fuel tank into an interior volume of the reservoir.

11. The fuel delivery module of claim 10, further comprising, in the reservoir, a pressure regulator and a fuel filter for controlling the fuel delivered by the fuel pump to the flange.

12. The fuel delivery module of claim 1, wherein the elastically deformable member comprises a metal strip for providing a rotation movement of the reservoir relative to the guide rod.

13. The fuel delivery module of claim 1, wherein the fuel pump is disposed in the reservoir, and further comprising a fuel line connecting the fuel pump to the flange to deliver fuel from the interior volume of the reservoir to the flange.

14. The fuel delivery module of claim 12, wherein the elastically deformable member further comprises a sliding member to connect the metal strip to the guide rod, and wherein the sliding member provides a sliding movement of the reservoir relative to the guide rod.

15. The fuel delivery module of claim 12, further comprising a ring stopper disposed on the guide rod to cooperate with the sliding member to define a limit of linear movement for the reservoir relative to the guide rod.

16. The fuel delivery module of claim 1, wherein the elastically deformable member comprises a metal string.

17. The fuel delivery module of claim 1, further comprising a handle to manipulate the linear movement of the reservoir relative to the guide rod and the flange.

18. A fuel delivery module for a vehicle having a low profile fuel tank, the fuel delivery module comprising:
   a flange for coupling to an opening of the low profile fuel tank;
   a reservoir in fluid communication with the flange to transport fuel from inside the fuel tank to outside the low profile fuel tank through the flange, the reservoir comprising a bottom surface;
   a connecting member for connecting the flange to the reservoir, the connecting member including a guide rod and an elastically deformable member having a first end moveably coupled to the guide rod and a second end fixedly attached to the reservoir, to facilitate movement of the fuel delivery module between an insertion position in which the reservoir is movably coupled to the flange to permit installation of the fuel delivery module in the low profile fuel tank, and an operating position in which the reservoir is fixedly coupled to the flange to securely seat the fuel delivery module in the low profile fuel tank.

19. The fuel delivery module of claim 18 wherein the elastically deformable member is shaped and constructed to permit variable orientation of the reservoir relative to the flange in the insertion position.

20. A two-position connecting member for connecting a flange of a fuel delivery module to a reservoir of the fuel delivery module, the connecting member comprising:
   a guide rod coupled to the flange at a first end of the guide rod;
   a guide rod receiver fixedly disposed on the reservoir; and,
   an elastically deformable member having a first end moveably coupled to the guide rod and a second end fixedly attached to the reservoir, such that a second end of the guide rod is selectively receivable in the guide rod receiver so as to facilitate movement of the fuel delivery module between an insertion position in which the reservoir is movably coupled to the flange, and an operating position in which the reservoir is fixedly coupled to the flange.

\* \* \* \* \*

UNITED STATES PATENT AND TRADEMARK OFFICE
CERTIFICATE OF CORRECTION

PATENT NO. : 9,539,893 B2  
APPLICATION NO. : 14/500355  
DATED : January 10, 2017  
INVENTOR(S) : Liu Page 1 of 1

It is certified that error appears in the above-identified patent and that said Letters Patent is hereby corrected as shown below:

On the Title Page

Item (12) delete "Hsu, et al." and insert -- Liu --.

Item (72) Inventors:
Should read:
-- (72) Inventor: Haixiang Liu, Brossard, (CA) --.

Signed and Sealed this
Eleventh Day of February, 2020

Andrei Iancu
*Director of the United States Patent and Trademark Office*